US010319357B2

United States Patent
Kumar et al.

(10) Patent No.: US 10,319,357 B2
(45) Date of Patent: Jun. 11, 2019

(54) SYSTEM AND A METHOD FOR ATTENUATING SOUND PRODUCED BY A VEHICLE

(71) Applicant: Wipro Limited, Bangalore (IN)

(72) Inventors: Vijay Kumar, Bangalore (IN); Thomas Chittakattu Ninan, Kannur (IN)

(73) Assignee: Wipro Limited, Bangalore (IN)

( * ) Notice: Subject to any disclaimer, the term of this patent is extended or adjusted under 35 U.S.C. 154(b) by 127 days.

(21) Appl. No.: 15/460,916

(22) Filed: Mar. 16, 2017

(65) Prior Publication Data

US 2018/0211646 A1  Jul. 26, 2018

(30) Foreign Application Priority Data

Jan. 20, 2017 (IN) .............................. 201741002353

(51) Int. Cl.
*G10K 11/04* (2006.01)
*F01N 1/00* (2006.01)
(Continued)

(52) U.S. Cl.
CPC .............. *G10K 11/04* (2013.01); *F01N 1/00* (2013.01); *F01N 1/168* (2013.01); *F01N 1/18* (2013.01);
(Continued)

(58) Field of Classification Search
CPC .. G10K 11/04; G10K 11/16; G10K 2210/128; G10K 2210/1282;
(Continued)

(56) References Cited

U.S. PATENT DOCUMENTS 5,822,439 A * 10/1998 Sakiyama ............... B60R 19/48
                                                        381/71.1
6,160,892 A    12/2000 Ver
(Continued)

FOREIGN PATENT DOCUMENTS

DE     10 2011 107 150        1/2012
DE     102011107150 A1 *      1/2012  ............. F01N 1/065
(Continued)

OTHER PUBLICATIONS

Extended European Search Report issued in the European Patent Office in counterpart European Application No. 17163931.3, dated Dec. 5, 2017, 9 pages.

*Primary Examiner* — Thomas G Black
*Assistant Examiner* — Sara J Lewandroski
(74) *Attorney, Agent, or Firm* — Finnegan, Henderson, Farabow, Garrett & Dunner, LLP

(57) ABSTRACT

The present disclosure discloses a system for attenuating sound produced by a vehicle. The system comprises a navigation device associated with the vehicle for determining location details of the vehicle, a sound reduction unit provisioned in an exhaust assembly of the vehicle. The system further includes an Electronic Control Unit (ECU) of the vehicle communicatively coupled to the navigation device and the sound reduction unit. The ECU is configured to detect sound reduction location, by comparing the location details with a pre-defined location data and operate the sound reduction unit to attenuate sound produced by the vehicle when the sound reduction location is detected. The system of the present disclosure, attenuates sound intensity of the vehicle to a desired level by considering surrounding conditions of the vehicle, thus the vehicle noise may be automatically attenuated in the sound sensitive areas or locations.

16 Claims, 4 Drawing Sheets

(51) Int. Cl.
*F01N 13/02* (2010.01)
*G01J 1/16* (2006.01)
*G01H 17/00* (2006.01)
*F02D 41/02* (2006.01)
*F01N 1/16* (2006.01)
*F01N 1/18* (2006.01)

(52) U.S. Cl.
CPC ........... *F01N 13/02* (2013.01); *F02D 41/021* (2013.01); *G01H 17/00* (2013.01); *G01J 1/16* (2013.01); *F01N 2900/12* (2013.01); *F02D 2200/701* (2013.01)

(58) Field of Classification Search
CPC .......... G10K 2210/12822; F01N 13/00; F01N 13/007; F01N 13/008; F01N 13/04; F01N 1/168; F01N 1/18
See application file for complete search history.

(56) References Cited

U.S. PATENT DOCUMENTS

| | | | |
|---|---|---|---|
| 8,243,941 B2 * | 8/2012 | Togawa | G10K 11/178 381/71.1 |
| 8,825,369 B2 | 9/2014 | Jin | |
| 2006/0151238 A1 | 7/2006 | Giordano | |
| 2011/0024227 A1 | 2/2011 | Gorke et al. | |
| 2012/0079815 A1 * | 4/2012 | Oohashi | F02D 41/029 60/285 |
| 2013/0186062 A1 * | 7/2013 | Pommerer | G10K 15/02 60/273 |
| 2014/0161671 A1 | 6/2014 | Cuellar et al. | |
| 2015/0051819 A1 * | 2/2015 | Ellis | F02D 41/021 701/113 |
| 2015/0100221 A1 * | 4/2015 | Routledge | F01N 1/165 701/111 |
| 2015/0275721 A1 * | 10/2015 | Ashraph | F01N 13/08 60/313 |
| 2016/0123210 A1 * | 5/2016 | Dmytrow | F01N 9/00 137/599.11 |
| 2017/0122155 A1 * | 5/2017 | Creager | F01N 1/166 |
| 2017/0133003 A1 * | 5/2017 | Nicolai | F01N 1/166 |
| 2017/0248048 A1 * | 8/2017 | Dziurda | F01N 1/163 |
| 2017/0268395 A1 * | 9/2017 | Chang | F01N 1/065 |
| 2017/0362976 A1 * | 12/2017 | Solferino | F01N 13/02 |
| 2017/0362990 A1 * | 12/2017 | Hwang | F01N 1/16 |
| 2018/0070191 A1 * | 3/2018 | Chang | H04R 3/00 |

FOREIGN PATENT DOCUMENTS

| | | |
|---|---|---|
| JP | 8-95581 | 4/1996 |
| JP | H08-95581 A * | 4/1996 |
| WO | WO 2012/030222 | 3/2012 |
| WO | WO 2017/079156 | 5/2017 |

* cited by examiner

SYSTEM AND A METHOD FOR ATTENUATING SOUND PRODUCED BY A VEHICLE

FIELD OF THE INVENTION

Present disclosure generally relates to the field of automobiles. Particularly, but not exclusively the present disclosure relates to exhaust assembly of a vehicle. Further embodiments of the present disclosure disclose a system employed in the exhaust assembly for attenuating sound produced by the vehicle.

BACKGROUND

As population continues to grow, number of vehicles being used on the roads is also increasing. Due to increase in number of vehicles, the problems associated with vehicle such as vehicle emissions have also increased substantially. In many areas, certain environmental restrictions have been imposed to control vehicle emissions. Also, in some of the places, laws and regulations have been implemented to control speed at which people drive, vehicle fuel efficiency as well as the emissions produced by vehicles.

One of the common vehicular emission problems may include noise or sound generated by the vehicle. The noise generated by the vehicles may be disturbing and may pose other repercussions. For instance, elevated sound levels may cause health issues, including hearing impairment, hypertension and sleep disturbance. Some birth defects have also been linked to excessive exposure to noise. However, a very little attention has been given to address noise pollution produced by vehicles on the roads. To maintain orderly and responsible vehicle operation, there exists a need to deter excessive noise emission from the vehicles.

Considering the above, various types of silencers and exhaust systems have been developed conventionally. The silencers so developed aims at curbing sound or noise produced by the vehicle with improvement in effectiveness of the silencer over other known silencers.

However, some of the vehicles such as sport utility vehicles, cruiser vehicles are tuned to generate loud engine noise to provide good riding or driving feel to the users. Hence, the sound attenuating silencers are not put into use in such vehicles. On the other hand, the sound produced by such vehicles may be problematic to the general public. Particularly, at some locations or sensitive areas including but not limited to schools, courts, hospitals, religious establishments etc., the vehicle producing high engine noise may cause disturbance and is undesirable.

In some of the conventional developments, techniques for detecting the vehicle entering a geo-fenced area has been developed. In such technique, the user of the vehicle may be alerted about the drive requirements in such areas, and may control different drive parameters when the geo-fence area is determined. Although, location and surrounding conditions of the vehicle is taken into consideration, and various drive parameters are controlled depending on the location, the parameter of reducing sound or noise of the vehicle is not taken into consideration by the conventional techniques.

The present disclosure is directed to overcome one or more limitations stated above.

SUMMARY

One or more shortcomings of the conventional systems to attenuate sound produced by the vehicle are overcome and additional advantages are provided through the present disclosure. Additional features and advantages are realized through the techniques of the present disclosure. Other embodiments and aspects of the disclosure are described in detail herein and are considered a part of the claimed disclosure.

In a non-limiting embodiment of the disclosure, a system for attenuating sound produced by a vehicle is disclosed. The system comprises a navigation device associated with the vehicle for determining location details of the vehicle, a sound reduction unit provisioned in an exhaust assembly of the vehicle. The system further includes an Electronic Control Unit (ECU) of the vehicle communicatively coupled to the navigation device and the sound reduction unit. The ECU is configured to detect sound reduction location, by comparing the location details with a pre-defined location data and operate the sound reduction unit to attenuate sound produced by the vehicle when the sound reduction location is detected.

In another non-limiting embodiment of the disclosure, a method for attenuating sound produced by a vehicle is disclosed. The method firstly comprises an act of determining, by a navigation device location details of the vehicle. The method further comprises acts of detecting, by the Electronic Control Unit (ECU) sound reduction location, by comparing the location details with a pre-defined location data and operating, by the ECU, the sound reduction unit to attenuate sound produced by the vehicle when the sound reduction location is detected.

In another embodiment, a non-transitory computer-readable storage medium for attenuating sound produced by a vehicle is disclosed, which when executed by a computing device, cause the computing device to perform operations including, determining location details of the vehicle. The operations further includes detecting a sound reduction location, by comparing the location details with a pre-defined location data. Finally, the operations include operating a sound reduction unit to attenuate sound produced by the vehicle when the sound reduction location is detected.

The foregoing summary is illustrative only and is not intended to be in any way limiting. in addition to the illustrative aspects, embodiments, and features described above, further aspects, embodiments, and features will become apparent by reference to the drawings and the following detailed description.

BRIEF DESCRIPTION OF THE ACCOMPANYING FIGURES

The accompanying drawings, which are incorporated in and constitute a part of this disclosure, illustrate exemplary embodiments and, together with the description, serve to explain the disclosed principles. The same numbers are used throughout the figures to reference like features and components. Some embodiments of device and/or methods in accordance with embodiments of the present subject matter are now described, by way of example only, and with reference to the accompanying figures, in which.

Figure 1:
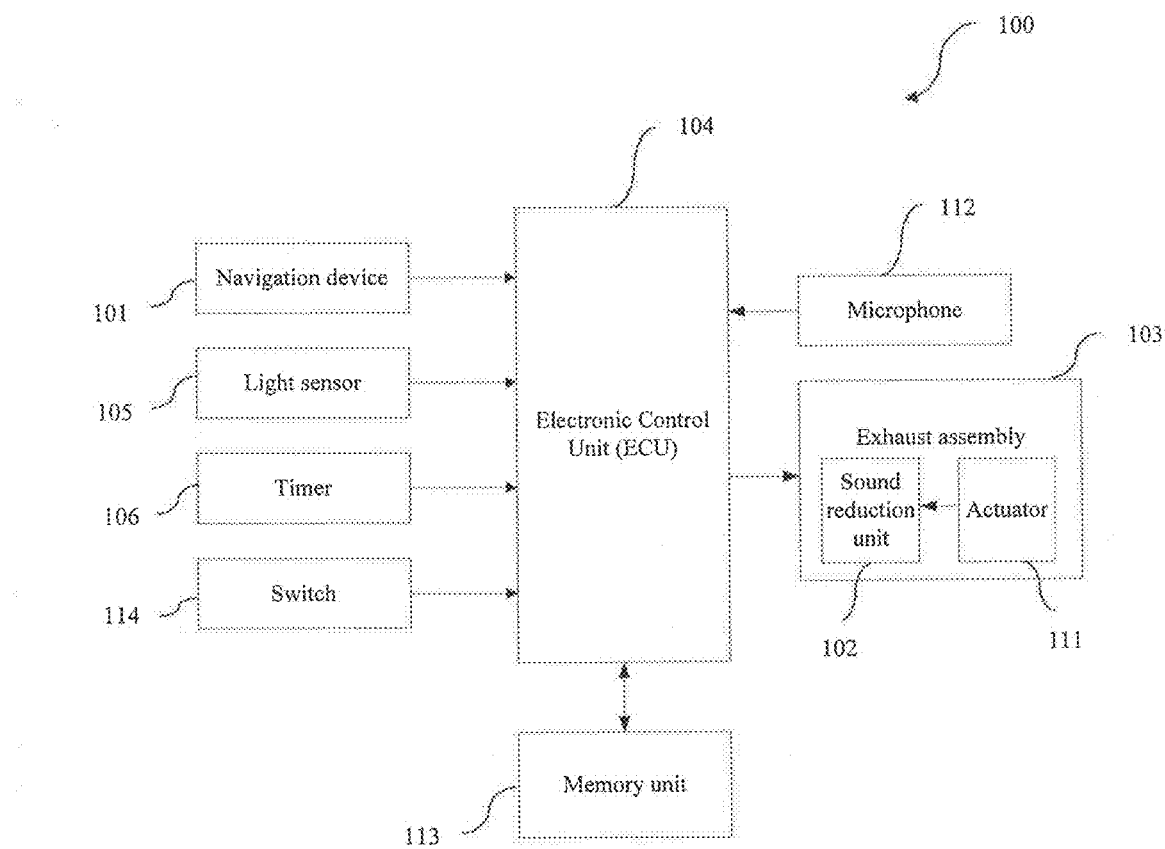
FIG. 1 shows a block diagram of a system for attenuating sound produced by vehicle, in accordance with some embodiments of the present disclosure.

It should be appreciated by those skilled in the art that any block diagrams herein represent conceptual views of illustrative device embodying the principles of the present subject matter. Similarly, it will be appreciated that any flow charts, flow diagrams, state transition diagrams, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below, it should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that device or method that comprises a list of components or steps does not include only those components or steps but may include other components or steps not expressly listed or inherent to such setup or device or method, in other words, one or more elements in a system or apparatus proceeded by "comprises . . . a" does not, without more constraints, preclude the existence of other elements or additional elements in the system or method.

Embodiments of the disclosure discloses a system to attenuate sound produced by the vehicle. The system attenuates the sound of the vehicle taking the surrounding conditions of the vehicle into consideration. The, provision of such system in the vehicle, allows attenuation of sound selectively in restricted or sensitive locations and normal operation of the vehicle without any attenuation of sound in unrestricted locations.

The system to attenuate sound produced by the vehicle comprises an Electronic Control Unit (ECU) of the vehicle. The ECU may be communicatively interfaced to a number of devices and components associated with the vehicle. The system includes a navigation device to determine location details of the vehicle. In an embodiment, the navigation device may be Global Positioning System (GPS) which is associated with the vehicle. The navigation device is interfaced with the ECU, and the ECU may receive inputs from the navigation device and identifies sound reduction location. A particular location may be identified as the sound reduction location by the ECU, when the location determined by the navigation device corresponds with at least one location in the pre-defined location data. In an embodiment, the pre-defined location data may be stored in a memory unit associated with the ECU. In one embodiment, the pre-defined location data where sound is to be attenuated, may include locations such as but not limited to hospitals, schools, courts and residential areas. In some embodiments, the sound reduction location may also be identified by the ECU based on signals received from at least one of light sensor and the timer associated with the vehicle.

The system further comprises a sound reduction unit employed in an exhaust assembly of the vehicle. The sound reduction unit is operatively coupled to the ECU and is configured to attenuate sound to the required level. The sound reduction unit comprises a plurality of sound filters, and, each of the plurality of sound filters may be configured to attenuate sound to a different level as per the requirement. The ECU is configured to operate the sound reduction unit, such that at least one sound filter of the plurality of sound filters may be aligned with an exhaust path of the exhaust assembly to filter attenuate the sound produced by vehicle to required level.

Further, the system comprises a microphone provisioned at an outlet of the exhaust path. The microphone may be configured to measure the intensity of sound, once the sound is attenuated selectively by the at least one sound filter of the plurality of sound filters. The microphone is communicatively coupled to the ECU and transmits the measured intensity of sound to the ECU. The ECU is further configured to compare the intensity of the sound measured by the microphone with a pre-defined sound data, and regulates the sound reduction unit based on the comparison. In an embodiment, the sound reduction unit is regulated to further attenuate sound if the measured intensity of sound by the microphone is greater than a pre-defined sound intensity stored in the memory unit.

In the following detailed description, embodiments of the disclosure are explained with reference of accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows a block diagram, illustrating different components of a system 100 to attenuate sound produced by a vehicle, in accordance with, some embodiments of the present disclosure.

In an exemplary implementation, as shown in FIG. 1, the system 100 comprises an Electronic Control Unit (ECU) 104, navigation device 101, light sensor 105, timer 106, switch 114, microphone 112, a memory unit 113 and an exhaust assembly 103 employed with a sound reduction unit 102 and an actuator 111.

As shown in FIG. 1, the components of the system 100—the navigation device 101, the light sensor 105, the timer 106, the switch 114, the memory unit 113, the microphone 112 and the exhaust assembly 103 are interfaced with the ECU 104 to communicate data.

The system of the present disclosure is configured to selectively attenuate sound produced by the vehicle by considering location, ambient conditions, and time information of the vehicle.

The ECU 104 of the system 100 is configured to detect sound reduction location based on inputs from the navigation device 101, the light sensor 105, the timer 106 and the switch 114. The sound reduction location is the location where sound of the vehicle is to be reduced to a particular level, and such location may include but not limited to schools, hospitals, courts, residential areas, and tunnels.

The navigation device 101 of the system 100 may be associated with the vehicle, and is configured to determine location details of the vehicle. In an embodiment, Global Positioning System (UPS) may be used to determine location details of the vehicle. The navigation device 101 interfaced with the ECU 104 transmits the determined location details to the ECU 104. The ECU 104 may determine sound reduction location i.e. location where sound produced by the vehicle is to be reduced, based on inputs from the navigation device 101. The sound reduction location may be identified based on pre-defined location data stored in the memory unit 113 of the system 100. The location determined by the navigation device 101 is compared with the pre-defined location data and when the determined location corresponds with at least one of the pre-defined location data, such a location may be identified as the sound reduction location. In an embodiment, the pre-defined location data may include areas or locations such as but not limited to hospitals, schools, courts etc. Thus, when the vehicle approaches any of these pre-defined locations, the ECU 104 recognizes that sound produced by the vehicle is to be reduced.

The system 100 also comprises a light sensor 105 provisioned in the vehicle. The light sensor 105 may be communicatively coupled to the ECU 104, and is configured to sense change in illumination level around the vehicle. In an embodiment, the light sensor 105 used in the system 100 may be at least one of photo resistors, photodiodes, and phototransistors. In areas, such as tunnels, the sound produced by the vehicle tends to amplify and may echo which is undesirable. Thus, to detect and attenuate sound of the vehicle in such areas, the light sensors 105 may be employed in the system 100. The light sensor 105 may detect change in illumination level of the light. Based on inputs from the light sensor 105 and the navigation device 101, the ECU 104 identifies such areas as sound reduction location, where sound of the vehicle is to be reduced. In an embodiment, such areas may be referred to as illumination based sound reduction location. It is to be understood that, illumination based sound reduction location is identified by the ECU 104 based on inputs from the light sensor 105 as well as the navigation device 101. The inputs from navigation device 101 ensures that the usage of vehicle in tunnels during night times are taken into consideration.

Further, the ECU 104 also receives inputs from the timer 106 to determine current time of the vehicle, in an embodiment, the memory unit 113 may comprise a pre-defined time data indicating time at which sound is to be reduced or attenuated in selective areas such as but not limited to hospitals and residential areas. In an embodiment, the ECU 104, may identify the sound reduction location based on the inputs from the timer 106 and the navigation device 101, and, such location or area may be referred to as time based sound reduction location. The time-based sound reduction location is identified by the ECU 104 when time determined by the timer 106 corresponds to at least one pre-defined time data stored in the memory unit 113 and based on the location determined by the navigation device 101. For instance, in locations such as residential areas, it is expected to maintain minimum sound level during night times. A pre-defined time data may include time data as say, 11 PM to 6 AM for residential areas. Thus, when the vehicle approaches residential areas during above mentioned time interval, the ECU 104 identifies such location as time based sound reduction location where sound is to be attenuated to required intensity. Similar time configurations may be pre-defined for other location such as schools or courts, where sound level is expected to be minimum during day time interval. In some embodiments, the system may include a switch 114 which may be manually operated to send signals to the ECU 104 to reduce sound produced by the vehicle as per the desire of the vehicle user.

Figure 2:
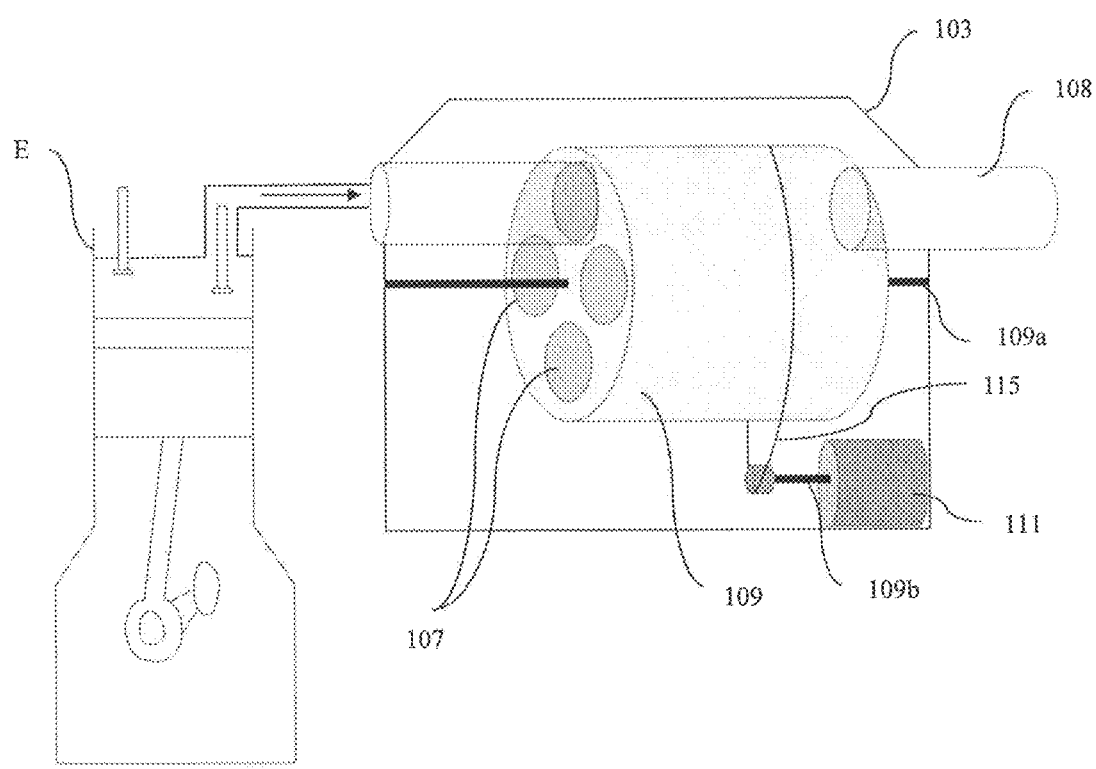
FIG. 2 illustrates schematic representation of vehicle exhaust assembly comprising around reduction unit to attenuate sound produced by engine of the vehicle, in accordance with some embodiments of the present disclosure.

The ECU 104 of the vehicle is operatively coupled to the sound reduction unit 102. The sound reduction unit 102 may be employed in the exhaust assembly 103 of the vehicle, and is configured to attenuate the sound produced by the vehicle to optimum pre-defined level. The sound reduction unit 102 comprises a plurality of sound filters 107 (as shown in FIG. 2), and, each of the sound filters of the plurality of sound filters 107 are configured to reduce sound to different levels as per the requirement. The ECU 104 is configured to operate the sound reduction unit 102, such that at least one sound filter of the plurality of sound filters 107 may be aligned with an exhaust path of the exhaust assembly 103 to attenuate the sound produced by vehicle to required level. Thus, the sound produced by the vehicle is attenuated before the exhaust is let into the surrounding environment.

The system 100 further comprises a microphone 112 positioned at an outlet of the exhaust assembly 103 of the vehicle. The microphone 112 is configured to measure the intensity of sound produced by the vehicle upon attenuation by the sound reduction unit 102. The microphone 112 is to ensure that the sound intensity of the vehicle is reduced to required level. In an embodiment, desired sound intensity to which the vehicle is to be attenuated may be pre-defined and stored in the memory unit 113. The ECU 104 which is communicatively coupled to the microphone 112 receives the corresponding signal of sound intensity measured by the microphone 112 after attenuation by the sound reduction unit 102. The ECU 104 then compares the measured sound intensity with the pre-defined sound intensity to which the vehicle sound is to be reduced. Upon comparison, if the ECU 104 identifies that the measured intensity of sound is greater than the desired pre-defined sound intensity to which the vehicle is to be attenuated, the ECU 104 operates the sound reduction unit 102 again. In an embodiment, the sound reduction unit 102 is configured to attenuate the sound produced by the vehicle to pre-defined sound intensity.

Referring now to FIG. 2 which illustrates a schematic view of the sound reduction unit 102 (as shown in FIG. 2) employed in the exhaust assembly 103 in accordance with some embodiments of the present disclosure. The sound reduction unit 102 is used to attenuate sound produced by the vehicle. In an exemplary embodiment as shown in FIG. 2, the sound reduction unit 102 is configured to attenuate sound produced by an engine E of the vehicle. As described in foregoing paragraphs, the ECU 104 operates the sound reduction unit 102 to attenuate sound produced by the vehicle, particularly engine E of the vehicle based on the inputs received from at least one of the navigation device 101, the light sensor 105, the timer 106 and the manually operated switch 114. As shown in FIG. 2, the sound reduction unit 102 is configured in the exhaust assembly 103 of the vehicle. The sound reduction unit 102 is configured to reduce the sound before letting the exhaust into the surrounding environment.

Figure 3:
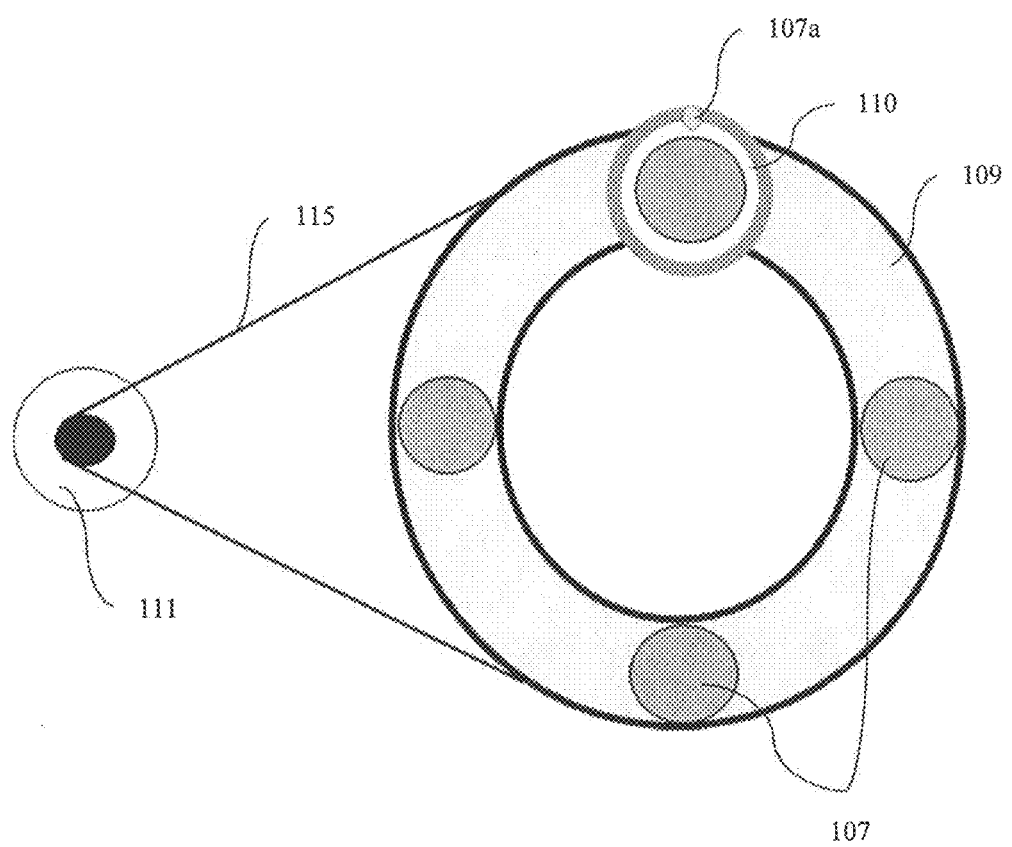
FIG. 3 illustrates schematic front view of the sound reduction unit of FIG. 2, in accordance with some embodiments of the present disclosure.

The sound reduction unit 102 comprises a plurality of sound filters 107 to attenuate the sound of the vehicle to required level. In an embodiment, the plurality of sound filters 107 are arranged in a polar array, wherein each sound filter of the plurality of sound filters 107 is configured to attenuate sound intensity to a different level. Thus, each sound filter 107 may have a different rating to reduce the sound intensity. In one embodiment, the sound reduction unit 102 comprises a support member 109 which further comprises a plurality of provisions 110 (as shown in FIG. 3) to accommodate the plurality of sound filters 107. The support member 109 is rotatably mounted on a shaft 109a provisioned in the exhaust assembly 103. The sound reduction unit 102 also comprises an actuator 111 to impart rotational motion to the support member 109. The actuator 111 may be at least one of hydraulic, pneumatic, electric or mechanical actuator to impart rotary motion to the support member 109. The support member 109 may be selectively driven by the actuator 111 through a drive means 115 which imparts rotary motion to the support member 109. In an embodiment, the drive means 115 used to drive the support member 109 may include a belt pulley drive, chain drive and a gear drive mechanism.

In an exemplary embodiment, the belt drive means 115 is used to drive the support member 109 by the actuator 111. In operation, a shaft 109b of the actuator 111 is connected to the pulley to which rotary motion is transmitted. The pulley further transmits rotary motion to the support member 109 through the belt. However, usage of belt pulley drive means 115 to impart rotary motion to the support member 109 should not be construed as a limitation to the present disclosure, as any other suitable drive means may be used.

The ECU 104 is configured to determine the sound intensity to which the vehicle is to be reduced based on the inputs, and operates the sound reduction unit 102 to align appropriate sound filter of the plurality of sound filters 107 with the exhaust path 108 to attenuate sound. In an embodiment of the disclosure, the ECU operates the actuator 111 to align suitable sound filter of the plurality of sound filters with the exhaust path 108 to attenuate sound. For example, considering that there are four sound filters 107 in the sound reduction unit 102 rated 50 decibels (dB), 60 dB, 70 dB and 80 dB and the ECU 104 determines that the sound level to which the vehicle is to be attenuated is 60 dB. The ECU 104 operates the sound reduction unit 102 based on the determined value so as to align the sound filter rated 60 dB with the exhaust path 108 and thus attenuating the sound of the vehicle to required level. Now referring to FIG. 3 which illustrates sectional front view of the sound reduction unit 102. The sound reduction unit 102 comprises a position detector 107a proximal to the exhaust path 108. The position detector 107a is configured to detect the position of the sound filters 107 with respect to the exhaust path 108. The position detector 107a is interfaced with the ECU 104 and communicates the position details of the sound filter 107. The ECU 104 is configured to regulate the actuator 111 to enable proper alignment of the appropriate sound filter 107 with the exhaust path 108 to attenuate sound.

Figure 4:
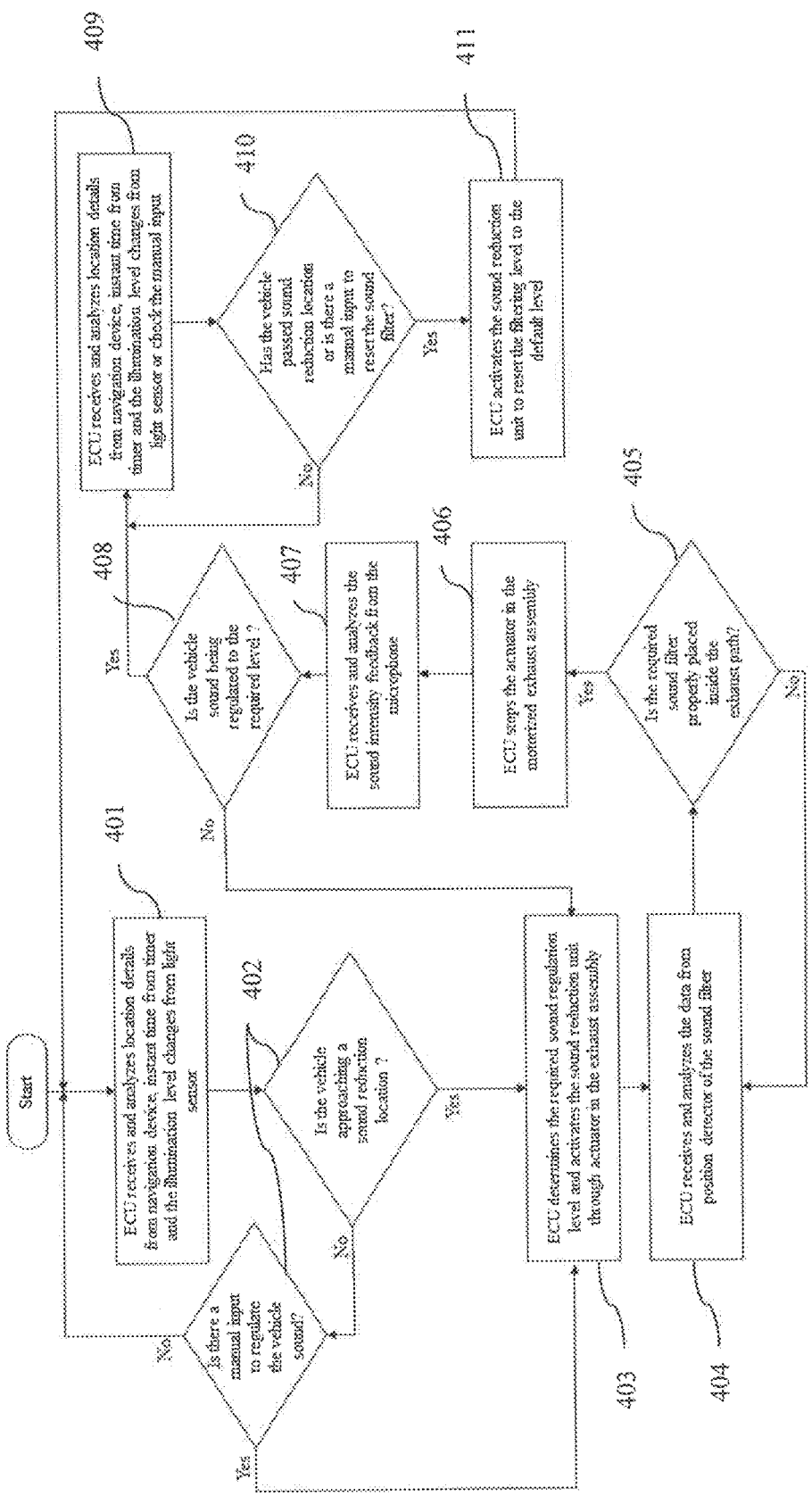
FIG. 4 illustrates a flowchart showing a method to attenuate sound produced by the vehicle in accordance with some embodiments of the present disclosure.

FIG. 4 illustrates a flowchart showing a method to attenuate sound produced by the vehicle in accordance with some embodiments of the present disclosure.

As illustrated in FIG. 4, the method comprises one or more blocks explaining an exemplary method in which the system 100 may be operated to attenuate the sound produced by the vehicle. The method may be described in the general context of computer executable instructions.

Generally, computer executable instructions can include routines, programs, objects, components, data structures, procedures, modules, and functions, which may perform particular functions or implement particular abstract data types.

The order in which the method is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the ECU 104 of the system 100 receives inputs from a plurality of associated components. The ECU 104 is associated with the navigation device 101 which is configured to determine location details of the vehicle. The ECU 104 then receives inputs regarding the location details of the vehicle through the navigation device 101. Further, the ECU 104 also receives inputs regarding changes in illumination level through the light sensor 105 associated with the ECU 104. In addition to inputs from the navigation device 101 and the light sensor 105, the ECU 104 receives time information front the timer 106 regarding current or instant time.

At blocks 402, the ECU 104 checks if there is a manual input from the user through switch 114 to attenuate sound produced by the vehicle. Further, the ECU 104 based on the inputs received from the navigation device 101, the light sensor 105, the timer 106 and the switch 114, identifies sound reduction location. In an embodiment, the sound reduction location may be identified by the when the location details from the navigation device 101 corresponds to pre-defined location data stored in the memory unit 113. Further, the sound reduction location may also be based on changes in illumination level around the vehicle, which is referred to as illumination based sound reduction location. In an embodiment, the illumination based sound reduction location is determined by the ECU 104 when the illumination level sensed by the light sensor 105 around the vehicle is below threshold illumination and based on location details from the navigation device 101. Further, the sound reduction location may also be based on time information from the timer 106. The ECU 104 identifies a particular location as time based sound reduction location if the time information from the timer corresponds to pre-defined time. The time-based sound reduction location also depends on location of the vehicle.

At block 403, the ECU 104 determines the sound intensity level to which the vehicle is to be brought upon identifying the sound reduction location, and accordingly operates the sound reduction unit 102 to attenuate sound produced by the vehicle. In an embodiment, the sound reduction unit 102 is positioned in the exhaust assembly 103 of the vehicle. The sound is attenuated through a plurality of sound filters 107 provisioned in the support member 109 of the sound reduction unit 102. The support member 109 is rotatably mounted in the exhaust assembly 103 and is driven by actuator 111. As per the determined regulation level of sound, appropriate sound filter 107 may be aligned with the exhaust path 108 of the exhaust assembly. Thus, sound filter 107 attenuates the sound of the vehicle in the exhaust path 108, before letting exhaust to the surrounding environment.

At block 404, the ECU 104 analyzes the position of the sound filter 107 based on data received from the position detector 107a. The position detector 107a ensures that appropriate sound filter 107 is aligned properly with the exhaust path 108 to attenuate sound of the vehicle. Subsequently, the ECU 104 performs a check at block 405, if the sound filter 107 is aligned with the exhaust path 108 of the exhaust assembly 103.

At block 406, once the sound filter 107 is aligned appropriately, the ECU 104 halts the operation of actuator 111.

At block 407, the microphone 112 which is positioned at outlet of the exhaust path 108 measures the sound intensity upon sound attenuation by the sound reduction unit 102. The microphone 112 is associated with the ECU 104 and communicates the measured intensity of sound by the microphone 112 to the ECU 104. Further, at block 408, the ECU 104 checks if the sound is regulated to the required predefined level.

If the sound is not regulated to the required level, the sound reduction unit 102 is activated again and steps explained in blocks 403 to 406 may be repeated to further reduce the sound of the vehicle to required level. At block 409 if sound is regulated to the required level, the ECU 104 checks if there is any manual input through switch 114 or receives and analyzes inputs from the navigation device 101, the light sensor 105, the timer 106 or manual operation of the switch 114. The ECU 104 analyzes and identifies the location as shown in block 410. If the location is not identified as sound reduction location or the input signal from the manual switch has been received as shown in block 410, the ECU 104 operates the sound reduction unit 102 as shown in block 411 to reset the filtering level to default level, thus allowing normal operation of the vehicle without any sound attenuation.

In an embodiment of the disclosure, the system 100 may use ECU 104 of the vehicle or a dedicated control unit. The Control unit may include specialized processing units such as integrated system (bus) controllers, memory management control units, floating point units, graphics processing units, digital signal processing units, etc. The processing unit may include a microprocessor, such as AMD Athlon, Duron or Opteron, ARM's application, embedded or secure processors, IBM PowerPC, Intel's Core, Itanium, Xeon, Celeron or other line of processors, etc. The control unit may be implemented using mainframe, distributed processor, multicore, parallel, grid, or other architectures. Some embodiments may utilize embedded technologies like application-specific integrated circuits (ASICs), digital signal processors (DSPs), Field Programmable Gate Arrays (FPGAs), microcontroller, etc.

In some embodiments, the control unit may be disposed in communication with one or more memory devices (e.g., RAM, ROM etc.) via a storage interface. The storage interface may connect to memory devices including, without limitation, memory drives, removable disc drives, etc., employing connection protocols such as serial advanced technology attachment (BATA), integrated drive electronics (IDE), IEEE-1394, universal serial bus (USB), fiber channel, small computing system interface (SCSI), etc. The memory drives may further include a drum, magnetic disc drive, magneto-optical drive, optical drive, redundant array of independent discs (RAID), solid-state memory devices, solid-state drives, etc.

Advantages of the embodiment of the present disclosure are illustrated herein.

In an embodiment, the present disclosure discloses a system to attenuate sound produced by the vehicle depending on the location of the vehicle.

In an embodiment, the system also takes into consideration illumination level changes around the vehicle and time information to attenuate sound produced by the vehicle.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter, it is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | System for attenuating sound produced by vehicle |
| 101 | Navigation device |
| 102 | Sound reduction unit |
| 103 | Exhaust assembly |
| 104 | Electronic Control Unit (ECU) |
| 105 | Light sensor |
| 106 | Timer |
| 107 | Sound filter(s) |
| 107a | Position detector of the sound filter |
| 108 | Exhaust path of the exhaust assembly |
| 109 | Support member |
| 109a | Shaft for the support member |
| 109b | Shaft for the actuator |
| 110 | Provisions in the support member |
| 111 | Actuator |
| 112 | Microphone |

-continued

| Reference Number | Description |
| --- | --- |
| 113 | Memory unit |
| 114 | Switch for manual operation of the sound reduction unit |
| 115 | Drive means for the support member |
| 401-411 | Flowchart blocks |

What is claimed is:

1. A system for attenuating sound produced by a vehicle, the system comprising:
   a navigation device associated with the vehicle for determining location details of the vehicle;
   a sound reduction unit comprising a plurality of sound filters provisioned in an exhaust assembly of the vehicle; and
   an Electronic Control Unit (ECU) of the vehicle communicatively coupled to the navigation device and the sound reduction unit, the ECU is configured to:
      detect a sound reduction location, by comparing the location details with a pre-defined location data; and
      operate the sound reduction unit, to attenuate sound produced by the vehicle, when the sound reduction location is detected, by selectively aligning at least one sound filter of the plurality of sound filters with exhaust path in the exhaust assembly.

2. The system as claimed in claim 1, wherein a location is identified as the sound reduction location when the determined location corresponds with at least one location in the pre-defined location data.

3. The system as claimed in claim 1, wherein a location is identified as the sound reduction location when the location details corresponds with at least one location in the pre-defined location data, and change in illumination level of light around the vehicle is beyond a pre-defined threshold illumination level.

4. The system as claimed in claim 3 further comprises a light sensor mounted on the vehicle and communicatively coupled with the ECU, wherein the light sensor is configured to sense change in the illumination level of light around the vehicle.

5. The system as claimed in claim 1, wherein a location is identified as the sound reduction location based on the location details corresponding with at least one location in the pre-defined location data, and based on pre-defined time.

6. The system as claimed in claim 1, further comprises a timer communicatively coupled with the ECU to determine current time.

7. The system as claimed in claim 1, wherein the plurality of sound filters provisioned in the exhaust assembly of the vehicle comprises the plurality of sound filters being rotatably mounted in the exhaust assembly of the vehicle.

8. The system as claimed in claim 1 further comprises a microphone communicatively coupled with the ECU, the microphone is positioned at an outlet portion of the exhaust path to measure intensity of sound at the outlet of the exhaust path.

9. The system as claimed in claim 8, wherein the ECU is configured to regulate the sound reduction unit based on a comparison of the intensity of sound measured by the microphone with a pre-defined sound data.

10. The system as claimed in claim 1, wherein the sound reduction unit further comprises:
    a support member comprising a plurality of provisions, rotatably mounted in the exhaust assembly, wherein, each of the plurality of provisions is configured to accommodate at least one sound filter of the plurality of sound filters; and
    an actuator coupled to the support member, wherein the actuator is operable by the ECU, to rotate the support member.

11. The system as claimed in claim 1, wherein each of the plurality of sound filters is configured to attenuate sound to different levels.

12. A vehicle comprising a system as claimed in claim 1.

13. A method for attenuating sound produced by a vehicle, the method comprising:
    determining, by a navigation device, location details of the vehicle;
    detecting, by an Electronic Control Unit (ECU), a sound reduction location, by comparing the location details with a pre-defined location data; and
    operating, by the ECU, a sound reduction unit comprising a plurality of sound filters, by selectively aligning at least one sound filter of the plurality of sound filters with exhaust path in an exhaust assembly of the vehicle, to attenuate sound produced by the vehicle when the sound reduction location is detected.

14. The method as claimed in claim 13 further comprises:
    sensing, by a light sensor, change in illumination level of light around the vehicle; and
    identifying, by the ECU, the sound reduction location based on the change in the illumination level beyond a pre-defined threshold illumination level and the determined location details corresponding with at least one location in the predefined location data.

15. The method as claimed in claim 13 further comprises:
    determining, by the ECU, time information from a timer;
    identifying, by the ECU, the sound reduction location based on the time information corresponding to a pre-defined time and the determined location details corresponding with at least one location in the pre-defined location data.

16. The method as claimed in claim 13 further comprises:
    measuring, by a microphone, intensity of sound at outlet of an exhaust path; and
    regulating, by the ECU, the sound reduction unit based on comparing the intensity of sound measured by the microphone with a pre-defined sound data.

* * * * *